United States Patent
Little et al.

(10) Patent No.: US 7,840,367 B2
(45) Date of Patent: Nov. 23, 2010

(54) MULTI-MODALITY INSPECTION SYSTEM

(75) Inventors: Francis Howard Little, Cincinnati, OH (US); Yanyan Wu, Schenectady, NY (US); Prabhjot Singh, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 404 days.

(21) Appl. No.: 11/946,244

(22) Filed: Nov. 28, 2007

(65) Prior Publication Data

US 2009/0138231 A1 May 28, 2009

(51) Int. Cl.
*G01B 11/03* (2006.01)
*G06F 17/00* (2006.01)

(52) U.S. Cl. ............... 702/95; 702/94; 702/150; 702/152; 250/559.3; 600/425

(58) Field of Classification Search .............. 702/95, 702/94, 152, 150
See application file for complete search history.

(56) References Cited

U.S. PATENT DOCUMENTS

| | | | | |
|---|---|---|---|---|
| 4,437,151 A * | 3/1984 | Hurt et al. | ............ | 702/95 |
| 4,945,501 A * | 7/1990 | Bell et al. | ............ | 702/95 |
| 4,969,110 A | 11/1990 | Little et al. | | |
| 5,283,822 A | 2/1994 | Little et al. | | |
| 5,848,115 A | 12/1998 | Little et al. | | |
| 6,341,153 B1 * | 1/2002 | Rivera et al. | ............ | 378/4 |
| 6,356,069 B1 | 3/2002 | Trantow et al. | | |
| 6,785,238 B1 | 8/2004 | Kago | | |
| 7,065,176 B2 | 6/2006 | Moermond et al. | | |
| 7,235,782 B2 | 6/2007 | Takane et al. | | |
| 7,254,209 B2 | 8/2007 | Zhao et al. | | |
| 7,272,254 B2 | 9/2007 | Shankarappa et al. | | |
| 2006/0156566 A1 | 7/2006 | Ingram et al. | | |
| 2006/0219014 A1 * | 10/2006 | Turner et al. | ............ | 73/643 |
| 2007/0160282 A1 | 7/2007 | Nightingale et al. | | |
| 2007/0217672 A1 | 9/2007 | Shannon et al. | | |
| 2008/0137105 A1 * | 6/2008 | Howard et al. | ............ | 356/630 |

OTHER PUBLICATIONS

P. J. Zombo et al., "Advanced NDE systems for Flexible Operation and Maintenance of Gas Turbine Components," Power-Gen International 2006—Orlando, Florida, Nov. 28-30, 2006. http:/www.powergeneration.siemens.com/NR/rdonlyres/A20692F-FFD0-440B-838B-9D16FE8F8925/0/3_Advanced/NDE/Systems.pdf., 13 pages.

Zhongguo Li et al., "A novel method for internal feature reconstruction based on Infrared thickness measurement," Third International Symposium on Multispectral Image Processing and Pattern Recognition, Proceedings of the SPIE, vol. 5286, pp. 230-237, 2003.

* cited by examiner

*Primary Examiner*—Hal D Wachsman
(74) *Attorney, Agent, or Firm*—Penny A. Clarke

(57) ABSTRACT

An inspection artifact includes a central portion and multiple optical and coordinate measurement machine (CMM) alignment features arranged on the central portion. The optical and CMM alignment features are configured to align the coordinates for an optical or a CMM measurement system to a common coordinate system. Another inspection artifact includes a central portion and multiple computed tomography (CT) alignment features arranged on the central portion. The CT alignment features are configured to align the coordinates for a CT system to a common coordinate system.

8 Claims, 8 Drawing Sheets

MULTI-MODALITY INSPECTION SYSTEM

BACKGROUND

The invention relates generally to non-destructive evaluation (NDE) and more particularly, to fusing multi-modality NDE inspection data for a component onto a three-dimensional model of the component.

A variety of NDE inspection modalities are available to inspect industrial components, including infrared radiography (IR), ultrasound (UT) inspection, eddy current (EC) inspection, digital radiography, coordinate measuring machine (CMM), optical measurement and computed tomography (CT). Typically, the output of the NDE takes the form of a two dimensional (2D) image. However, the 2D NDE images are not readily comparable with three-dimensional (3D) models of the component under test. In addition, the 2D NDE images do not lend themselves to alignment of NDE data obtained using different NDE modalities.

Previous attempts to map NDE data onto a 3D model used reference geometries attaches to both the 3D model and to the component under test. However, the reference geometry may introduce inspection artifacts and noise, thereby reducing the inspection accuracy, such that the mapping process cannot be performed with a high enough degree of accuracy to satisfy the requirements of various inspection processes, for example the inspection of turbine blades. Moreover, it would be impractical to attach a reference geometry to every component under test.

It would therefore be desirable to provide a mechanical method for fusing multi-modality inspection data that does not require the attachment of a reference geometry to the component under test. It would also be desirable for the mechanical method to fuse multi-modal NDE data onto a 3D model without attachment of a reference geometry to the 3D model and to the component under test.

BRIEF DESCRIPTION

Briefly, one aspect of the present invention resides in a method for fusing multi-modality inspection data. The method includes mounting an artifact on a table for an inspection system corresponding to one of multiple inspection modalities. The method further includes acquiring test data for the artifact using the respective inspection system. The method further includes using multiple features on the artifact and the test data to generate transformation matrices and to transform the system coordinates for the respective inspection system to a common coordinate system. The method further includes removing the artifact from the table and mounting a component on the table for the respective inspection system. The method further includes acquiring inspection data for the component using the inspection system and using the transformation matrices to map the inspection data onto a three-dimensional model of the component in the common coordinate system to form a three-dimensional inspection model of the component.

Another aspect of the present invention resides in an inspection artifact that includes a central portion and multiple computed tomography (CT) alignment features arranged on the central portion. The CT alignment features are configured to align the coordinates for a CT system to a common coordinate system.

Yet another aspect of the present invention resides in an inspection artifact that includes a central portion and multiple optical alignment features arranged on the central portion. The optical alignment features are configured to align the coordinates for an optical measurement system to a common coordinate system.

Another aspect of the present invention resides in a multi-modality inspection system having a common coordinate system. The multi-modality inspection system includes at least one of an optical measurement system and a coordinate measurement machine system and further includes at least one of an ultrasound (UT) system and an infrared radiography (IR) system. The multi-modality inspection system further includes an inspection artifact configured for connection to the optical or CMM measurement system and for connection to at least one of the UT and IR systems. The artifact includes a central portion and multiple optical and CMM alignment features arranged on the central portion. The optical and CMM alignment features are configured to align the coordinates for the optical or CMM measurement system to the common coordinate system. The artifact further includes multiple UT and IR alignment features arranged on the central portion. The UT and IR alignment features are configured to align the coordinates for at least one of the UT system and the IR system to the common coordinate system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
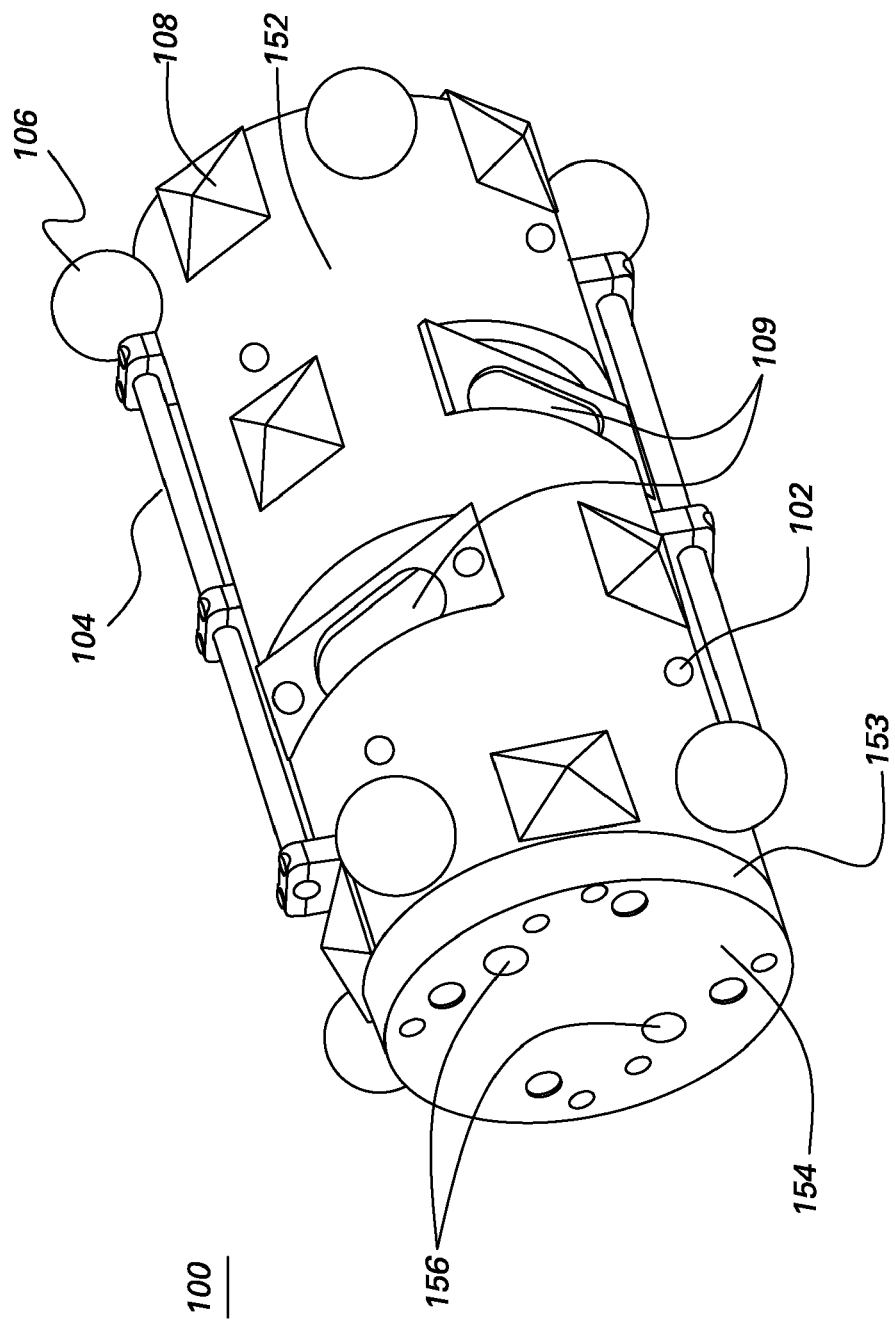
FIG. 1 depicts a multi-modality, inspection artifact embodiment of the invention.

A multi-modality inspection artifact 100 embodiment of the invention is described with reference to FIG. 1. As shown in FIG. 1, the artifact 100 comprises a central portion 152. A number of computed tomography (CT) alignment features 102 are arranged on the central portion 152. The CT alignment features 102 are configured to align the coordinates for a CT system 110 to a common coordinate system. CT system 110 is discussed below with reference to FIGS. 6 and 7. In addition for the example shown in FIG. 1, a number of optical alignment features 106, 108 and coordinate measurement machine (CMM) alignment features 106 are arranged on the central portion 152. The optical and CMM alignment features are configured to align the coordinates for an optical or a CMM measurement system 120 to the common coordinate system. Optical measurement system 120 and CMM system 120 is discussed below with reference to FIGS. 6 and 7. One non-limiting example of an optical system comprises a laser scanning system. In addition for the example shown in FIG. 1, a number of ultrasound (UT) and infrared radiography (IR) alignment features 109 are arranged on the central portion 152. The UT and IR alignment features 109 are configured to align the coordinates for at least one of an UT system 130 and an IR system 140 to the common coordinate system. UT system 130 and IR system 140 are discussed below with reference to FIGS. 6 and 7.

Although the example artifact 100 shown in FIG. 1 includes alignment features for CT, optical, CMM, IR and UT inspection systems, depending on the application, the artifact 100 may include only a subset of these alignment features. For example, optical or coordinate measurement machine (CMM) measurements could be used for external inspections, in combination with UT measurements, to measure thickness and internal defects. For this example, the artifact 100 need only include optical and CMM alignment features 106, 108 and UT alignment features 109. In another example, CT measurements are performed for both internal and external inspection. For this example, artifact 100 need only include CT alignment features 102. The various modalities have different strengths and thus can be selected based on the inspection application. Briefly, CT can be used to perform both internal and external inspections and generally is the most accurate of the modalities for both internal and external inspection. In particular, CT can be used to accurately measure internal wall thickness and to inspect internal defects. As noted above, optical and CMM measurements provide external inspection data. UT is used to measure thickness and internal defects, and IR is used to inspect relatively thin portions of components and to inspect internal defects in the thin portions of the components. In addition, eddy current (EC) inspection can be employed to measure relatively thin coatings, as well as surface cracks.

For the illustrated embodiment, the optical and CMM alignment features 106, 108 comprise spheres 106 and pyramids 108 disposed on an outer surface of the central portion 152. The optical alignment is performed as follows. As a preliminary matter, the artifact 100 is measured, for example using a coordinate measurement machine (CMM), to define the characteristics of the artifact 100. The artifact is then imaged, and in particular, the optical and CMM alignment features 106, 106 are imaged using the optical or CMM inspection system 120. The resulting images (not shown) are processed using computer algorithms to determine the center of the sphere. In this manner, the locations of at least three (and typically of four or more) points on the artifact are determined with specificity, and the identified locations are used to determine the coordinates for the inspection artifact in the coordinate system for the optical inspection system 120. As indicated in FIG. 1, the spheres 106 are relatively large. The size of the spheres is limited due to the spatial constraints imposed by the various inspection systems. The pyramids 108 are included for alignment with certain optical systems, such as a light gage inspection system, which work better with flat surfaces. The external surfaces of the pyramids are imaged, and the resulting images are processed using computer algorithms to determine the intersection points of the surfaces. These points are then used (either by themselves or with the points determined using the spheres 106) to determine the coordinates for the inspection artifact in the coordinate system for the optical or CMM inspection system 120.

For the illustrated embodiment, the central portion 152 of the artifact comprises a cylinder 152. Beneficially, this cylindrical shape facilitates alignment of the CT system 110 to the common coordinate system. In addition, for the embodiment depicted in FIG. 1, the CT alignment features 102 comprise spheres 102 disposed on an outer surface of the central portion 152. The dimensions of the spheres will vary based on the x-ray energy. In one example, the radius of the spheres is selected such that the signal attenuation through the sphere is less than about twenty-five percent (25%). In addition, the artifact 100 shown in FIG. 1 further includes alignment rods 104, which extend along the outer surface of the cylindrical central portion 152. The rods 104 are not used for alignment with the common coordinate system but rather provide a means for improving the relative alignment of CT slices. In other words, the alignment rods 104 facilitate proper stacking of the resulting CT images.

For the illustrated embodiment, the UT and IR alignment features 109 comprise thickness and edge plates 109, as indicated in FIG. 1. Generally, the feature pertaining to a subject single-modality inspection system 110, 120, 130, 140 (in this case, UT or IR systems 130, 140) will define the respective feature in space relative to the test artifact 100. This feature will reference the resulting images in the coordinate system of the test artifact 100. By continuing this process across all inspection modality systems 110, 120, 130, 140 of interest, the images from each of the respective inspection systems 110, 120, 130, 140 can thus be referenced to the artifact 100.

Figure 2:
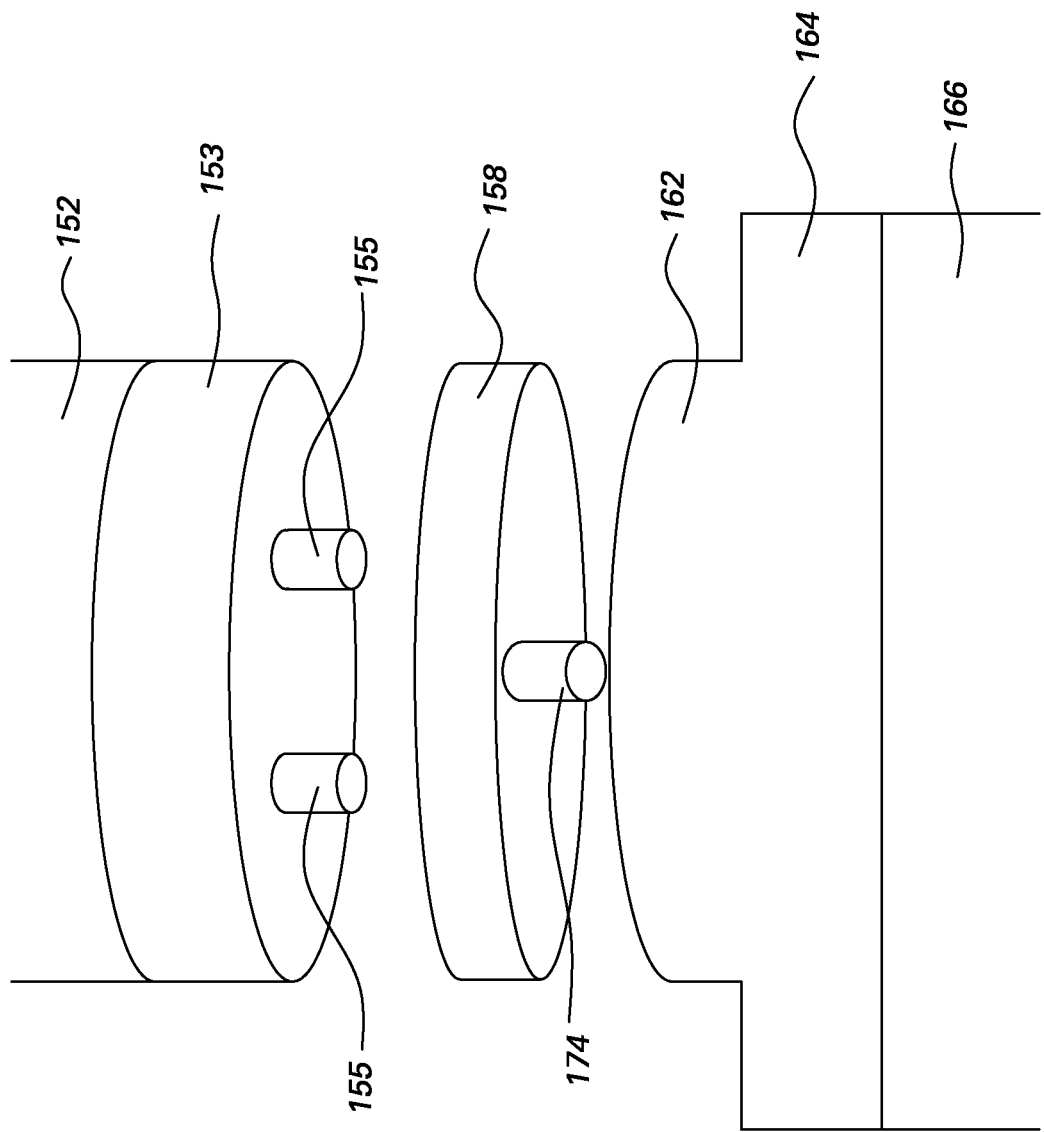
FIG. 2 depicts, in exploded view, an example arrangement of the artifact mounted to a rotary table via an adapter and a chuck.
Figure 3:
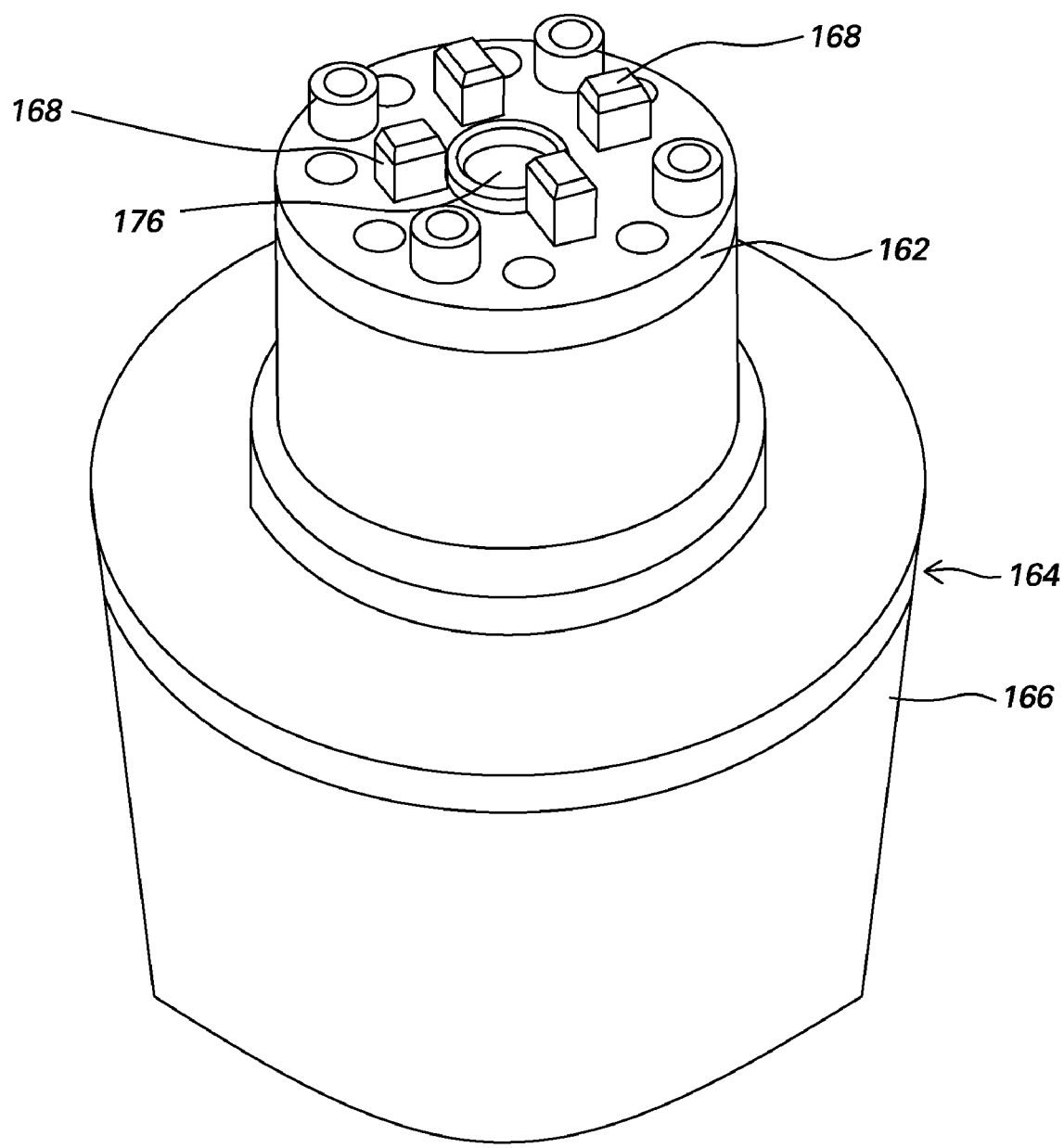
FIG. 3 shows an example chuck mounted to an example rotary table in the arrangement of FIG. 2.
Figure 4:
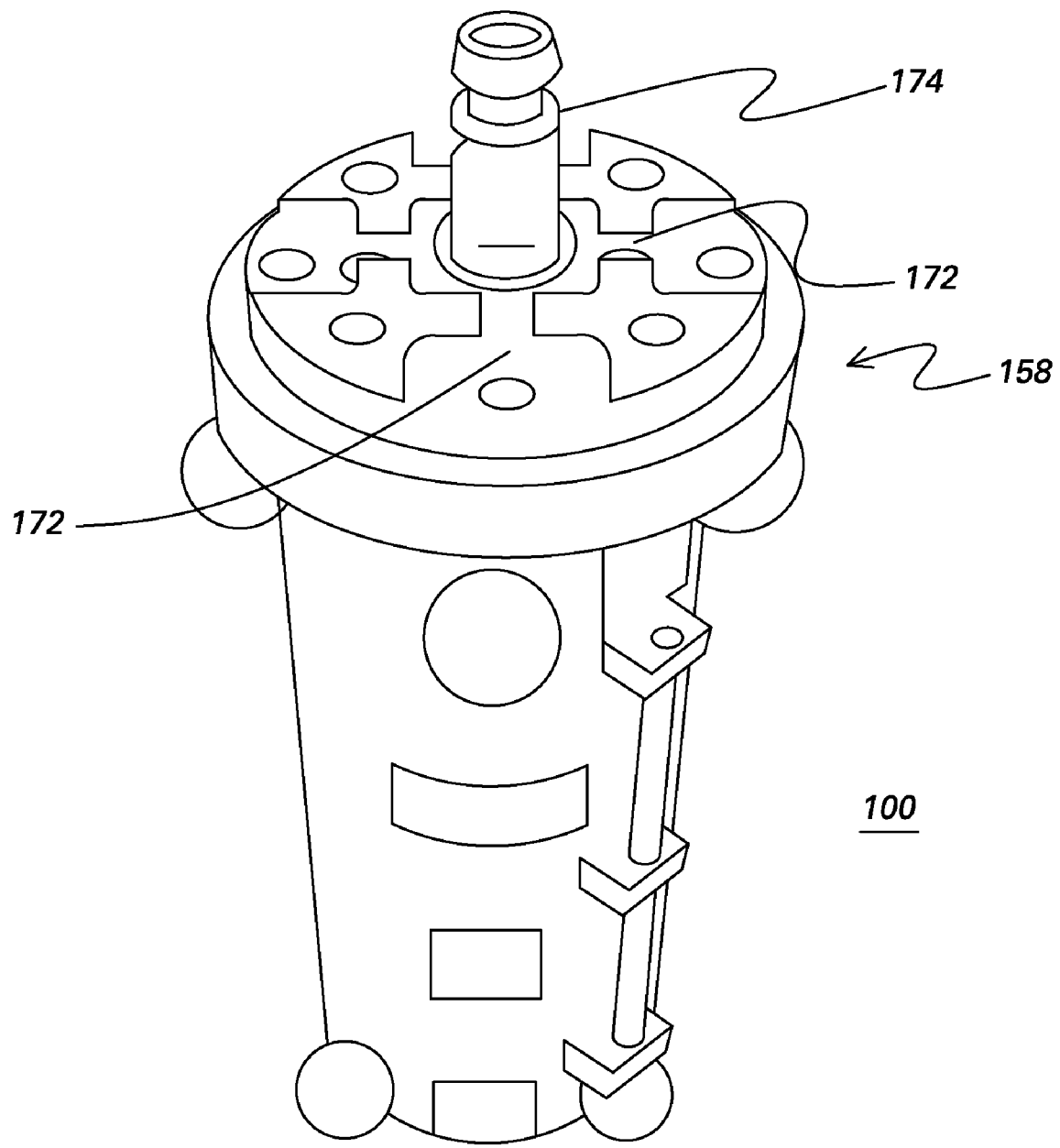
FIG. 4 shows an example adapter attached to the artifact of FIG. 1 in the arrangement of FIG. 2.

For the multi-modality example shown in FIG. 1, the artifact 100 further comprises a surface 154 defining a number of holes 156. In this example, the holes 156 are configured to connect to an adapter 158 for connection to CT system 110, optical measurement system 120, and at least one of the UT and IR systems 130, 140. In the illustrated example, the surface 154 is formed on an endplate 153, which is attached to the central portion 152. In one specific example, the adapter 158 is used to mount the artifact 100 on a rotary table 164 in each of the inspection systems. FIG. 2 depicts in exploded view the artifact 100 mounted on rotary table 164. It should be noted that the arrangement shown in FIGS. 2-4 is merely one example, and the artifact 100 may be mounted in the inspection systems using a variety of attachment means. In the illustrated example, the holes 156 (FIG. 1) receive expansion pins 155, as indicated for example in FIG. 2. The expansion pins 155 are configured to attach the artifact to adapter 158, as indicated in FIG. 2. In addition, screws may be used to hold the adapter 158 and the artifact 100 together. Beneficially, the adapter 158 and expansion pins 155 provides a common surface and two precision pins to locate the artifact (or part fixture, as discussed below) relative to the rotary tables 164 in each of the inspection systems.

As further indicated in FIG. 2, the adapter 158 is mounted on a chuck 162. FIG. 3 shows an example chuck 162 mounted to an example rotary table 164 in this arrangement. In this example, the rotary table 164 rotates relative to a stationary base 166. As shown for example in FIG. 3, the chuck 162 includes precision locators 168 for the adapter 158. For the example chuck 162 shown in FIG. 3, there are 4 precision locators 168. These locators 168 are received into grooves 172 (FIG. 4) in the adapter 158. In addition the chuck 162 defines a central opening 176 for receiving a mandrel 174 (FIG. 4) on adapter 158.

An example adapter 158 is shown in FIG. 4. For the illustrated example, adapter 158 includes a mandrel 174 for insertion into the central opening 176 in chuck 162. The adapter 158 further includes multiple grooves 172 for receiving the locator plates 168 on the chuck 158.

For the examples illustrated in FIGS. 1, 3 and 4, the endplate 153 (FIG. 1), adapter 158 (FIG. 4) and chuck 162 (FIG.

3) are commercially available from system 3R, having an office and place of business in Elk Grove Village, Ill. As noted above, the arrangement shown in FIGS. 2-4 is merely illustrative, and the artifact 100 may be mounted in the inspection systems using a variety of attachment means A method embodiment for fusing multi-modality inspection data is described with reference to FIG. 5. As a preliminary matter, the artifact 100 is measured, for example using a coordinate measurement machine (CMM), to define the characteristics of the artifact 100. As indicated for example in FIG. 5, the method includes at step 200, mounting an artifact 100 on a table 164 for an inspection system 110, 120, 130, 140 corresponding to an inspection modality, such as CT, IR, optical, CMM or UT. At step 202, test data for the artifact 100 is acquired using the inspection system 110, 120, 130, 140. At step 204, multiple features 102, 106, 108, 109 on the artifact and the test data are used to generate transformation matrices and to transform the system coordinates for the inspection system to a common coordinate system. Briefly, the transformation matrices transform the system coordinates to the common coordinate system. Beneficially, the transformation matrices can further be used to map inspection data for the respective inspection system into the common coordinate system, as described below. The use of features 102, 106, 108, 109 to transform the system coordinates for the inspection systems to the common coordinate system is discussed above with reference to the artifact 100 embodiment of the invention. At step 206, the artifact is removed from the table 164. At step 208, a component 10 is mounted on the table 164 for one of the inspection systems. Non-limiting examples of the component 10 include industrial parts, including but not limited to turbine airfoils, blades, disks, and shafts. At step 210, inspection data is acquired for the component using the inspection system. At step 212, the transformation matrices are used to map the inspection data onto a three-dimensional model 12 of the component in the common coordinate system to form a three-dimensional inspection model 14 of the component.

According to a more particular embodiment, the three-dimensional model 12 comprises a solid computer aided design CAD model. In other examples, the 3D model 12 comprises a mesh model or a voxel model. Beneficially, a solid CAD model is more precise than a mesh model. For example, a solid CAD model contains the geometry information for the component 10, as well as topology information of geometric entities, such as vertices, edges, faces, and neighboring information of geometric entities. It can retain tolerance specifications and engineering requirements, whereas a mesh model cannot.

Figure 7:
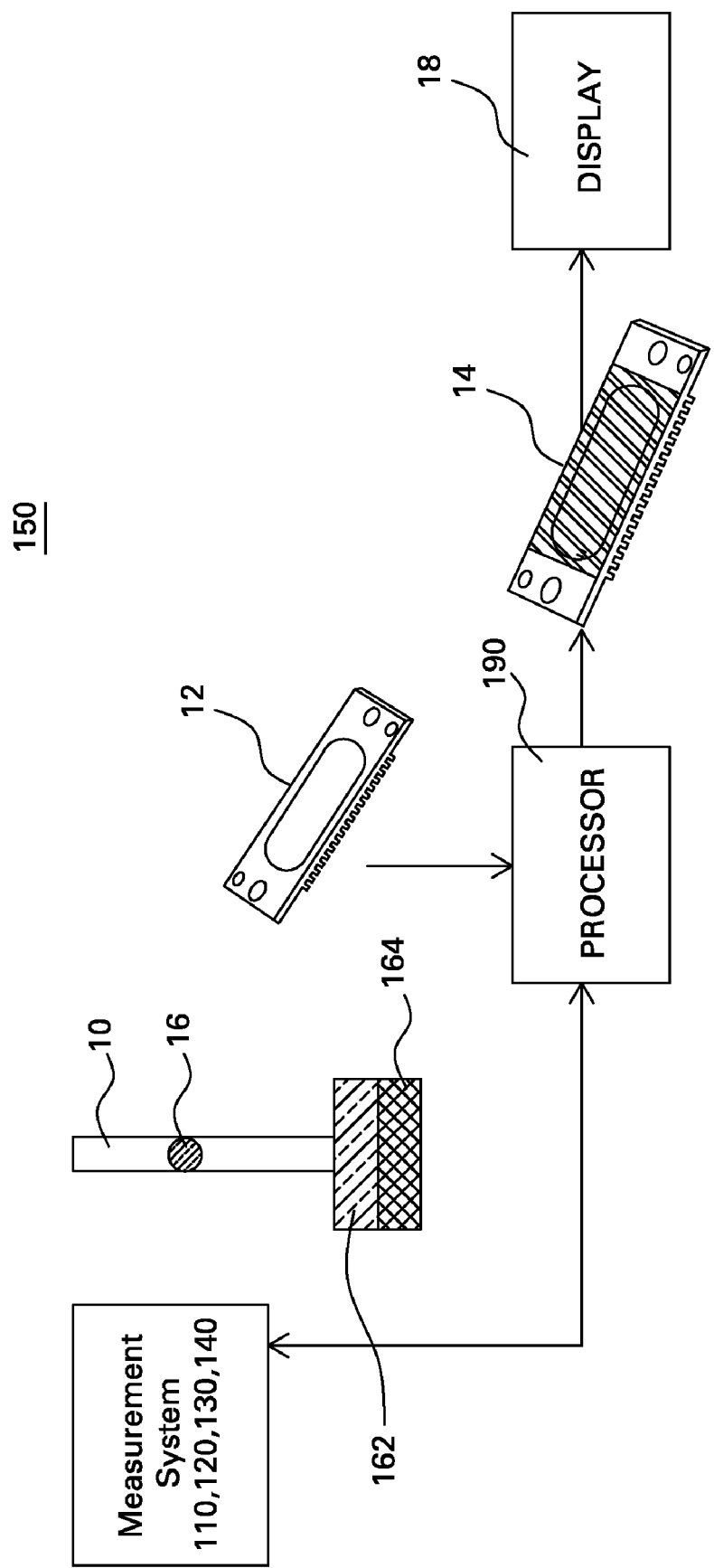
FIG. 7 illustrates a multi-modality, inspection system embodiment of the invention, with a component mounted in the inspection system for inspection of the component.

According to a particular embodiment, the acquisition step 210 comprises acquiring inspection data set for a local region 16 on the component 10. An example local region is indicated in FIG. 7. This example is merely illustrative. For certain applications, it is desirable to inspect only a portion of a component. In other applications, it is desirable to inspect one or more portions of a component using one inspection modality and to inspect other portions of the component 10 using other inspection modalities. For example, for defect inspections, thicker regions of a component might be evaluated based on the inspection data from X-ray CT, while thinner regions of the component might be evaluated based on the inspection results from IR.

Figure 5:
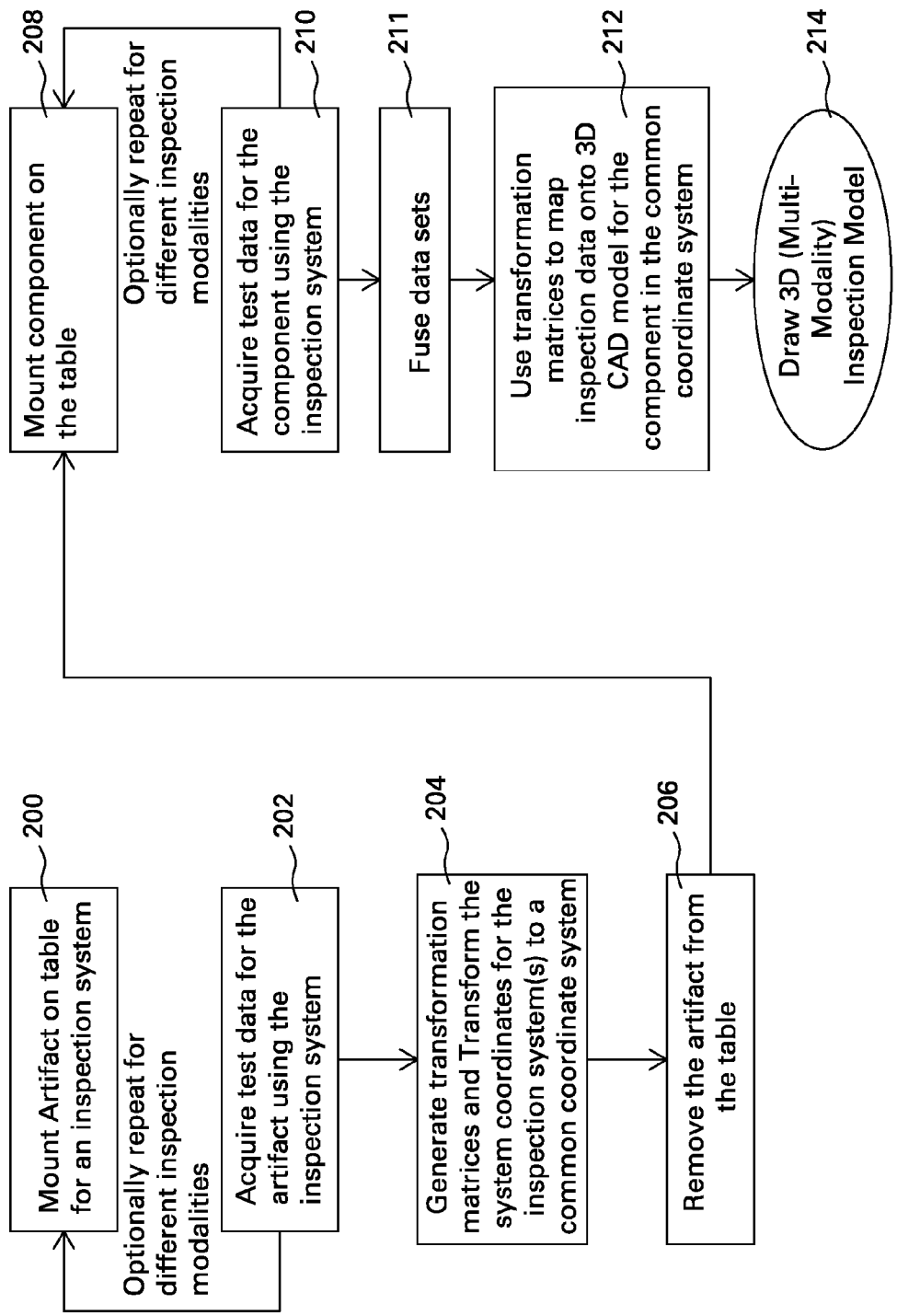
FIG. 5 is a process map for a method of fusing multi-modality inspection data.

As indicated in FIG. 5, steps 200 and 202 are optionally repeated for additional inspection system(s) 110, 120, 130, 140, to obtain multi-modality inspection data for the artifact. In this case, the system coordinates for the respective inspection systems are transformed in step 204. For this multi-modality embodiment, steps 208 and 210 are repeated to acquire multi-modality inspection data for the component 10, and the resulting three-dimensional inspection model 14 is a three-dimensional, multi-modality inspection model 14 of the component 10.

For multi-modality embodiments, the method optionally includes at step 211 fusing the multi-modality data to select the most accurate data from the different inspection modalities. The fusion can be performed with or without pre-knowledge of the relative accuracies of the different inspection modalities. In one embodiment, the data fusion step 211 comprises performing at least one statistical analysis on the inspection data to determine a plurality of redundant data and removing the redundant data from the inspection data sets to form a fused data set. At step 212, the fused data set is mapped onto the three-dimensional model 12 of the component 10 to form the three-dimensional, multi-modality inspection model 14 of the component. Non-limiting examples of the statistical analysis include applying decision-making algorithms, such as Bayesian Models or Neural Network algorithms, to determine the most accurate data. The most accurate data is retained in the fusing step and forms a fused data set. In one non-limiting example, the fused data set is mapped onto the 3D model 12 to form the 3D inspection model 14. In this manner, the redundant data is removed from the 3D inspection model. It should be noted that the data fusion can also be performed after mapping step 212, in which case the redundant data is removed from the 3D inspection model 14. One benefit of the later approach is that geometry/engineering specification information on the CAD model can be used to assist inspection data fusion. Beneficially, this approach can be applied in the absence of pre-knowledge about the relative accuracy of various inspection modalities.

In another example embodiment, fusion step 211 comprises removing redundant data from the inspection data to form a fused data set, wherein the removal is based on the relative accuracy of respective ones of the inspection modalities. At step 212, the fused data set is mapped onto the three-dimensional model 12 of the component 10 to form the three-dimensional, multi-modality inspection model 14 of the component. This approach leverages knowledge of the relative accuracy of the various inspection modalities. For example, when comparing CT and CMM data, one knows that CT data is typically more accurate for data corresponding to regions internal to the component ("internal data"), whereas CMM data is typically more accurate for data corresponding to the surface of the component ("external data"). For this example, external CMM data and internal CT would be selected for alignment onto the CAD model 12. In another example, when comparing ultrasound and IR data, ultrasound data is typically more accurate for thicker regions of the component, whereas IR typically provides more accurate data for thinner regions of the component. Thus, the ultrasound data for the thinner regions can be removed, as can the IR data for the thicker regions of the component. The remaining ultrasound data for the thicker regions and IR data for the thinner regions can then be fused with the CAD model 12. In a more complex example, CT data can be selected to construct the internal cavity information, IR data can be selected to construct the internal wall of a thin wall, and CMM data can be selected to construct the external boundary of the fused multimodal inspection model.

There are a variety of applications for the resulting three-dimensional inspection model 14 for the component 10. As shown at step 214 in FIG. 5, the model 14 may be displayed, for example, on a monitor 18. A monitor 18 is schematically depicted in FIG. 7. In addition, the method may further include performing an engineering analysis, such as finite element model (FEM) analysis, on the three-dimensional inspection model 14 for the component 10. In this manner, the three-dimensional inspection model 14 generated using the inspection method can be used to perform more accurate analyses on the component 10 to aid in engineering and design of improved components. In other example applications, the method further includes using the three-dimensional inspection model 14 for the component 10 to modify at least one of (a) a design of the component and (b) a manufacturing process for the component.

A multi-modality inspection system 150 having a common coordinate system is described with reference to FIGS. 6 and 7. In one example, the inspection system 150 includes an optical measurement system 120 and at least one of an ultrasound (UT) system 130 and an infrared radiography (IR) system 140. Each of the individual, single-modality inspection systems 110, 120, 130 and 140 is known and, as such, is merely schematically indicated in FIG. 6. The inspection system 150 further includes an inspection artifact 100 configured for connection to the optical measurement system 120 and to at least one of the UT and IR systems 130, 140. The artifact 100 is described above with reference to FIG. 1 and is configured for connection to the optical measurement system 120, and to at least one of the UT and IR systems 130, 140. Example connection means for the artifact 100 are discussed above with reference to FIGS. 2-4. However, as noted above, these examples are merely illustrative and the invention is not limited to a specific means for attaching the artifact to the rotary tables 164 in the respective single-modality inspection systems 110, 120, 130, 140. In the illustrated example, the artifact 100 is attached to rotary table 164 via a chuck 162 and an adaptor 158. The inspection system 150 optionally further includes a computed tomography (CT) system 110, in which case the artifact 100 is further configured for attachment to the CT system 110.

Figure 6:
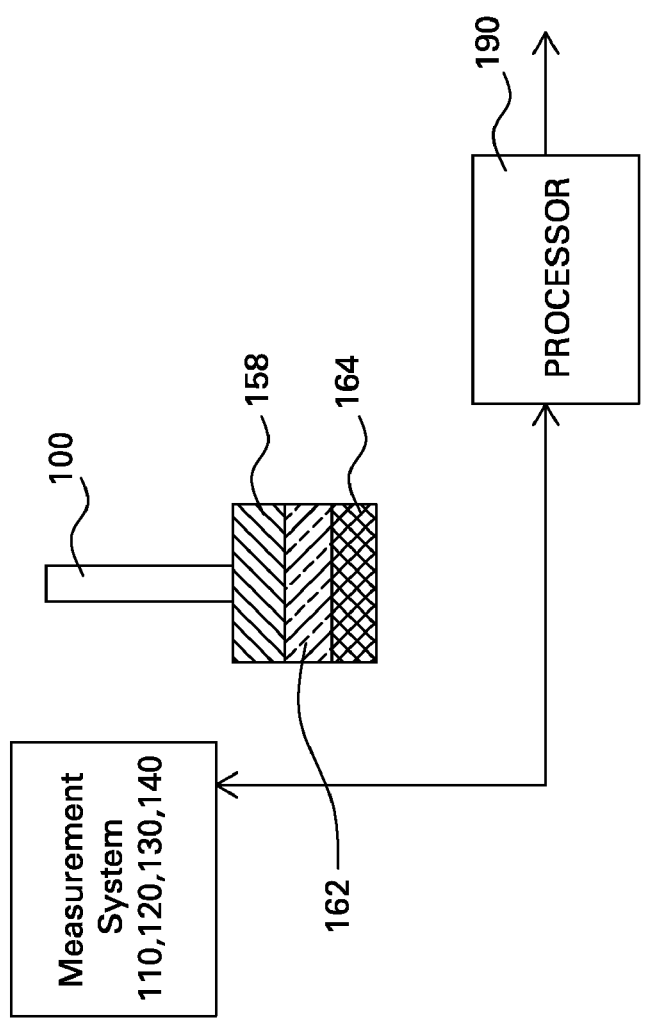
FIG. 6 illustrates a multi-modality, inspection system embodiment of the invention, with a test artifact mounted in the inspection system.
Figure 8:
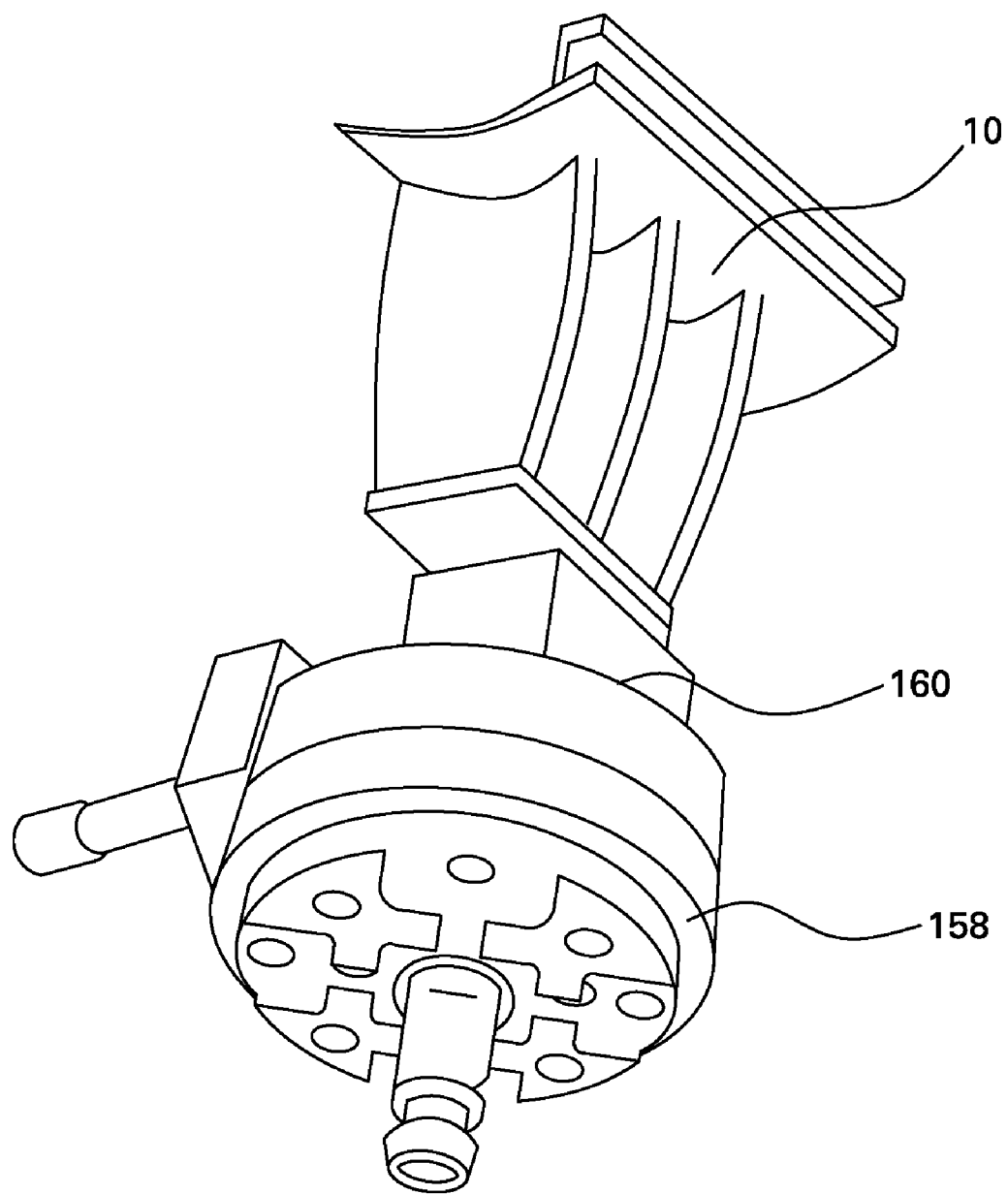
FIG. 8 shows a vane mounted in a part fixture, which is attached to an adapter for connection to a rotary table via a chuck.

For the embodiment illustrated in FIG. 6, the system 150 further includes a processor 190 configured to acquire test data sets on the artifact 100 from respective ones of the single-modality inspection systems 110, 120, 130 and 140. The processor 190 is further configured to use respective ones of the alignment features 102, 106, 108, 109 and the test data sets to transform the respective coordinates for single-modality inspection systems 110, 120, 130 and 140 to the common coordinate system. As discussed above with reference to FIG. 5, after the artifact 100 has been inspected, the artifact is removed, and a component 10 is mounted on the rotary table 164. For the example depicted in FIG. 7, the component 10 is mounted in a part fixture 160, which is connected to the rotary table 164 (for example via a chuck 162 and an adapter 158, not shown in FIG. 7). FIG. 8 shows an example component (vane 10) mounted to adapter 158 via part fixture 160. This example is merely illustrative, and the invention is not limited to this component or this means of attaching the part 10 to the single-modality inspection systems 110, 120, 130, 140. As indicated in FIG. 7, the processor 190 is further configured to acquire inspection data sets for component 10 using respective ones of the single-modality inspection systems 110, 120, 130 and 140. The processor 190 is further configured to use the transformed system coordinates to map the inspection data sets onto a three-dimensional model 12 of the component 10 to form a three-dimensional multi-modality inspection model 14 of the component, as indicated in FIG. 7.

It should be noted that the present invention is not limited to any particular processor for performing the processing tasks of the invention. The term "processor," as that term is used herein, is intended to denote any machine that is equipped with a combination of hardware and software for accepting a structured input and processing the input in accordance with prescribed rules to produce an output, for performing the tasks of the invention, as will be understood by those skilled in the art.

As schematically depicted in FIG. 7, the inspection system 150 further optionally includes a display monitor 18 configured to display the three-dimensional multi-modality inspection model 14 of the component 10.

Beneficially, the invention provides a mechanical method for referencing multi-modal images to a common coordinate system. The invention further provides a method for mapping multi-modal images of a component under test onto a 3D model of the component in a common coordinate system. End-uses for the resulting 3D multi-modal, inspection model include display and use in engineering analyses.

Furthermore, the invention provides a mechanical method for the calibration of individual inspection modality systems and evaluation of the capabilities of different modalities.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A multi-modality inspection system having a common coordinate system, said multi-modality inspection system comprising:
   at least one of an optical measurement machine and a coordinate measurement machine (CMM) measurement system;
   at least one of an ultrasound (UT) system and an infrared radiography (IR) system; and
   an inspection artifact configured for connection to at least one of said optical and CMM measurement systems, and at least one of said UT and IR systems, said inspection artifact comprising:
      a central portion,
      a plurality of optical alignment features and CMM alignment features disposed on said central portion, wherein said optical alignment features and CMM alignment features are configured to align a plurality of coordinates for at least one of said optical measurement machine and CMM measurement systems to the common coordinate system, and
      a plurality of UT alignment features and IR alignment features disposed on said central portion, wherein said UT alignment features and said IR alignment features are configured to align a plurality of coordinates for at least one of said UT system and said IR system to the common coordinate system.

2. The multi-modality inspection system of claim 1, further comprising a computed tomography (CT) system,
   wherein said inspection artifact is further configured for connection to said CT system, and
   wherein said inspection artifact further comprises a plurality of CT alignment features arranged on said central portion, wherein said CT alignment features are configured to align a plurality of coordinates for said CT system to the common coordinate system.

3. The multi-modality inspection system of claim 2, wherein said central portion comprises a cylinder, wherein said CT alignment features comprise a plurality of spheres disposed on an outer surface of said central portion, and wherein said inspection artifact further comprises a plurality of alignment rods extending along the outer surface of said cylindrical central portion.

4. The multi-modality inspection system of claim 1, further comprising:

an adapter for connection to at least one of said optical and CMM measurement systems, and at least one of said UT and IR systems, wherein said inspection artifact comprises a surface defining a plurality of holes, wherein the holes are configured to connect to said adapter.

5. The multi-modality inspection system of claim 1, wherein said optical and CMM alignment features comprise a plurality of spheres and a plurality of pyramids disposed on an outer surface of said central portion.

6. The multi-modality inspection system of claim 1, wherein said UT and IR alignment features comprises thickness and edge plates.

7. The multi-modality inspection system of claim 1, further comprising a processor configured to:

acquire a plurality of test data sets on said artifact from said optical measurement system and from at least one of said UT system and said IR system;

use said optical alignment features, UT and IR alignment features and the test data sets to generate a plurality of transformation matrices and to transform the respective coordinates for said optical measurement system and for at least one of said UT system and IR system to the common coordinate system;

acquire a plurality of inspection data sets for a component using one or more of said optical measurement system, UT system and IR system; and use the transformation matrices to map the inspection data sets onto a three-dimensional model of the component in the common coordinate system to form a three-dimensional multi-modality inspection model of the component.

8. The multi-modality inspection system of claim 7, further comprising a display monitor configured to display the three-dimensional multi-modality inspection model of the component.

* * * * *